(12) United States Patent
James et al.

(10) Patent No.: US 6,685,266 B2
(45) Date of Patent: Feb. 3, 2004

(54) CHILD SEAT DEVICE

(76) Inventors: Reagan W. James, Rosestien 2, Stavanger (NO), N-4022; Grete Maj James, Rosestien 2, Stavanger (NO), N-4022

(*) Notice: Subject to any disclaimer, the term of this patent is extended or adjusted under 35 U.S.C. 154(b) by 0 days.

(21) Appl. No.: 10/220,838

(22) PCT Filed: Mar. 3, 2001

(86) PCT No.: PCT/NO01/00096
§ 371 (c)(1),
(2), (4) Date: Sep. 5, 2002

(87) PCT Pub. No.: WO01/66380
PCT Pub. Date: Sep. 13, 2001

(65) Prior Publication Data
US 2003/0090134 A1 May 15, 2003

(30) Foreign Application Priority Data
Mar. 7, 2000 (NO) .......................................... 20001145

(51) Int. Cl.$^7$ ................................................ B60N 2/28
(52) U.S. Cl. ............................ 297/250.1; 297/354.13; 297/364; 297/378.12
(58) Field of Search .................... 297/250.1, 354.12, 297/354.13, 363, 364, 365, 378.12

(56) References Cited

U.S. PATENT DOCUMENTS

| | | | | |
|---|---|---|---|---|
| 3,265,438 A | * | 8/1966 | Regan et al. | 297/452.41 |
| 3,419,309 A | | 12/1968 | Smith | |
| 4,627,659 A | * | 12/1986 | Hall | 297/488 |
| 4,793,651 A | * | 12/1988 | Inagaki et al. | 297/180.11 |
| 5,143,419 A | | 9/1992 | Tepper et al. | |
| 5,292,176 A | | 3/1994 | Artz | |
| 5,335,968 A | | 8/1994 | Sheridan et al. | |
| 5,366,271 A | * | 11/1994 | Johnston et al. | 297/250.1 |
| 5,496,092 A | | 3/1996 | Williams et al. | |
| 6,142,565 A | * | 11/2000 | Rieder | 297/219.12 |
| 6,179,383 B1 | * | 1/2001 | Ochi | 297/250.1 |

FOREIGN PATENT DOCUMENTS

| | | |
|---|---|---|
| DE | 43 33 131 | 3/1995 |
| EP | 537934 | 4/1993 |
| GB | 2282322 | 4/1995 |
| NO | 166398 | 4/1991 |
| SE | 508 955 | 11/1998 |
| WO | 94/05189 | 3/1994 |

* cited by examiner

Primary Examiner—Peter R. Brown
(74) Attorney, Agent, or Firm—Andrus, Sceales, Starke & Sawall, LLP

(57) ABSTRACT

The invention concerns a child seat device, in particular for securing a child in a motor vehicle, on land, sea and in the air, comprising seat and back portions with outer shells (1, 2) and inner inflatable cushions (3, 4), and side portions (5, 6, 7, 8, 9, 9', 10) extending out-/inwards, preferably at right angles, relative to the seat and back portions. Further, the seat and back portions (1, 2, 3, 4) are pivoted to each other, and the side portions (5, 6, 7, 8, 9, 9', 10) are pivoted to the respective ones of the seat and back portions, so that whenever required, the child seat can be folded up completely for storing when the cushions (3, 4, 7, 8, 10) are deflated.

12 Claims, 10 Drawing Sheets

CHILD SEAT DEVICE

CROSS REFERENCE TO RELATED APPLICATION

The present application is the U.S. national stage application of International Application PCT/NO01/00096, filed Mar. 6, 2001, which international application was published on Sep. 13, 2001 as International Publication WO 01/66380. The International Application claims priority of Norwegian Patent Application 20001145, filed Mar. 7, 2000.

The present invention concerns a child seat device, in particular for securing a child in a motor vehicle on land, sea and in the air, comprising seat and back portions, and side portions which extend, preferably at right angles, outward relative to the seat and back portions, at least the seat portion having an outer shell and an inner inflatable cushion.

Today it is quite normal that infants are secured in motor vehicles by means of different types of child seats which are appropriately secured in the vehicle. On the other hand, since such child seats are space demanding, they will, when the child seat is not used to secure a child, occupy relatively a large portion of the space when stored in the boot of the vehicle.

In NO-C 166398 the above-mentioned defect is remedied in the way that the child seat comprises inflatable parts. Thereby the space requirement during storage can be reduced considerably in that the air is let out of the inflatable parts. An essential defect of the child seat, which is known from this publication, is, however, that neither the back portion nor the side portions extending outward from the seat and back portions, have outer shells of a rigid material, which is normally expected from such child seats. Therefore, the known child seat is hardly capable of providing adequate protection of the child in all situations that may occur, e.g. in a collision.

BRIEF DESCRIPTION OF THE INVENTION

An object of the present invention is thus to provide a child seat which can be folded together completely, and which, moreover, provides the intended protection for the child in the child seat when the seat is unfolded. Another object is that safe and stable storage of a belt buckle of the separate seat belt of the child seat should be possible in the child seat. Other objects are that the collapsing and inflating of the child seat should be done in a simple manner, while, at the same time, the folded child seat should occupy the smallest possible space when stored.

The above objects are realized according to the invention, as specified in the characterizing part of the first of the two present independent Claims, in the way that the seat and back portions are pivoted to one another, and that the seat portions are pivoted to at least one of the seat and back portions, so that whenever required, the child seat can be folded up when the cushions are deflated. Additionally, as further specified by the characterizing part of the second of the two present independent Claims, in the way that the seat and back portions are pivoted to one another, that the side portions are attached, e.g. pivotally, to at least one of the seat and back portions, so that, whenever required, the child seat can be folded up when one or more of the cushions are deflated, and that the child seat comprises a seat belt for the child, the belt buckle of the seat belt being placeable in the seat portion.

In accordance with preferred embodiments of the invention, the side portions are either two-part or in one single piece. Moreover, the child seat is fixed in its unfolded position of use by means of a locking pin, which is releasably arranged in the two side portion parts, or a locking element which is releasably arranged in the back portion. Other advantageous features of the invention will be understood from the Claims and otherwise from the description.

BRIEF DESCRIPTION OF THE DRAWING

Referring to the appended drawings, preferred embodiments of the invention will be explained in further detail in the following part of the description, FIG. 1 showing a perspective view of an embodiment which comprises seat and back portions, and two-part side portions which extend outward from the seat and back portions, each portion of the child seat comprising an outer shell and an inner cushion, the portions of the child seat being pivoted to each other in such a way that the child seat can be folded up completely when the cushions are deflated, and the child seat being held fixed in its unfolded position of use by means of a locking pin, which is releasably arranged in the side portion.

DETAILED DESCRIPTION OF THE INVENTION

Figure 1:
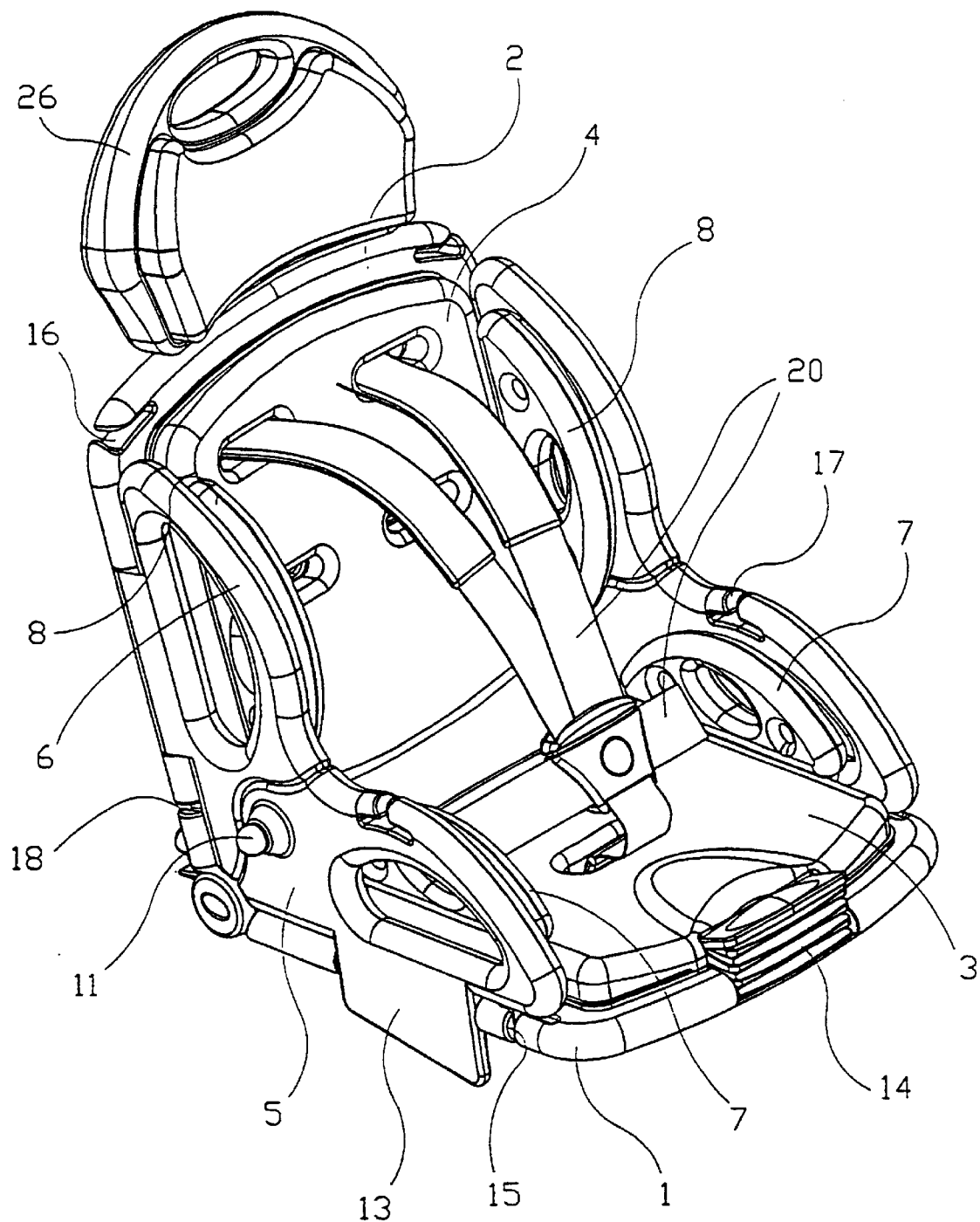
Figure 2:
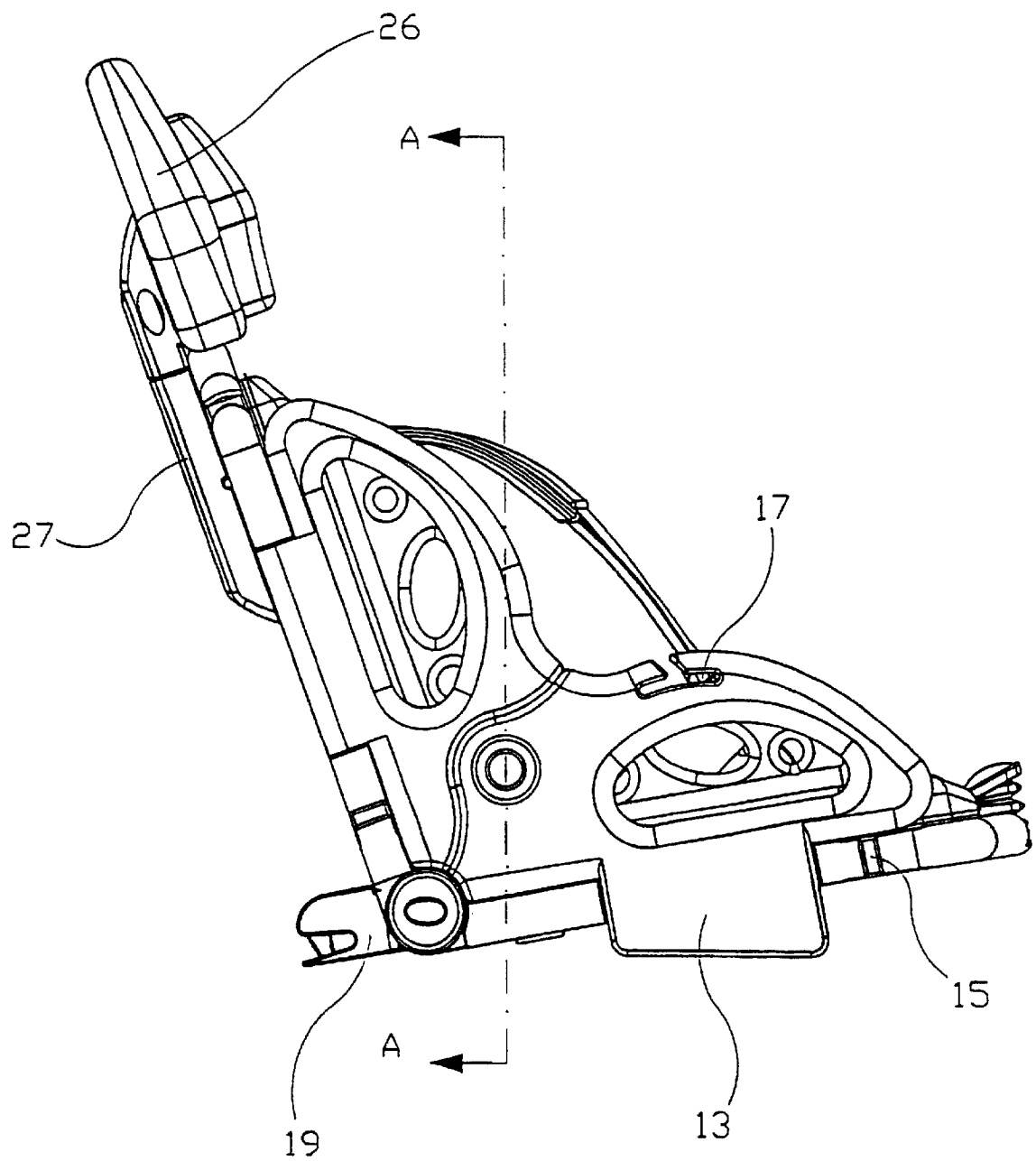
FIG. 2 showing a view of the child seat, the child seat viewed directly towards the side portion.

The child seat in accordance with the present invention is intended, as already mentioned, especially for use in the securing of children in motor vehicles, but of course the child seat may be used in any connection in which, especially during transport, a safe keeping of the child is required. The respective portions of the child seat comprise an outer rigid shell and inner inflatable cushions facing the child. The cushions are inflated when the seat is used, and deflated before the child seat is to be folded up to be stored. Additionally it will be understood that the child seat must be produced from materials which will provide adequate protection for the child.

In the embodiment shown in FIGS. 1–5 the seat and back portions each have an outer shell 1, 2 and an inner inflatable cushion 3, 4. The seat and back portions 1, 2 are pivoted to one another at the terminal edges abutting one another. This may be effected by means of any suitable connection formed in the outer shells 1, 2, e.g. a pin and sleeve connection.

Further the child seat has side portions 5, 6, 7, 8 which extend outward, preferably at right angles relative to the seat and back portions, when the seat is unfolded. As shown, the side portions are split in two, and the two side portion parts have outer shells 5, 6 and inner inflatable cushions 7, 8. Similarly to the seat and back portions, the side portion parts are pivotal with one part attached to the seat portion 1, 3 and the other part attached to the back portion 2, 4. The side portions can be pivoted to the seat and back portions in any suitable manner that allows the side portions, when all the cushions have been deflated, to be pivoted outwards from the seat and back portions, e.g. a pin and sleeve connection.

Figure 3:
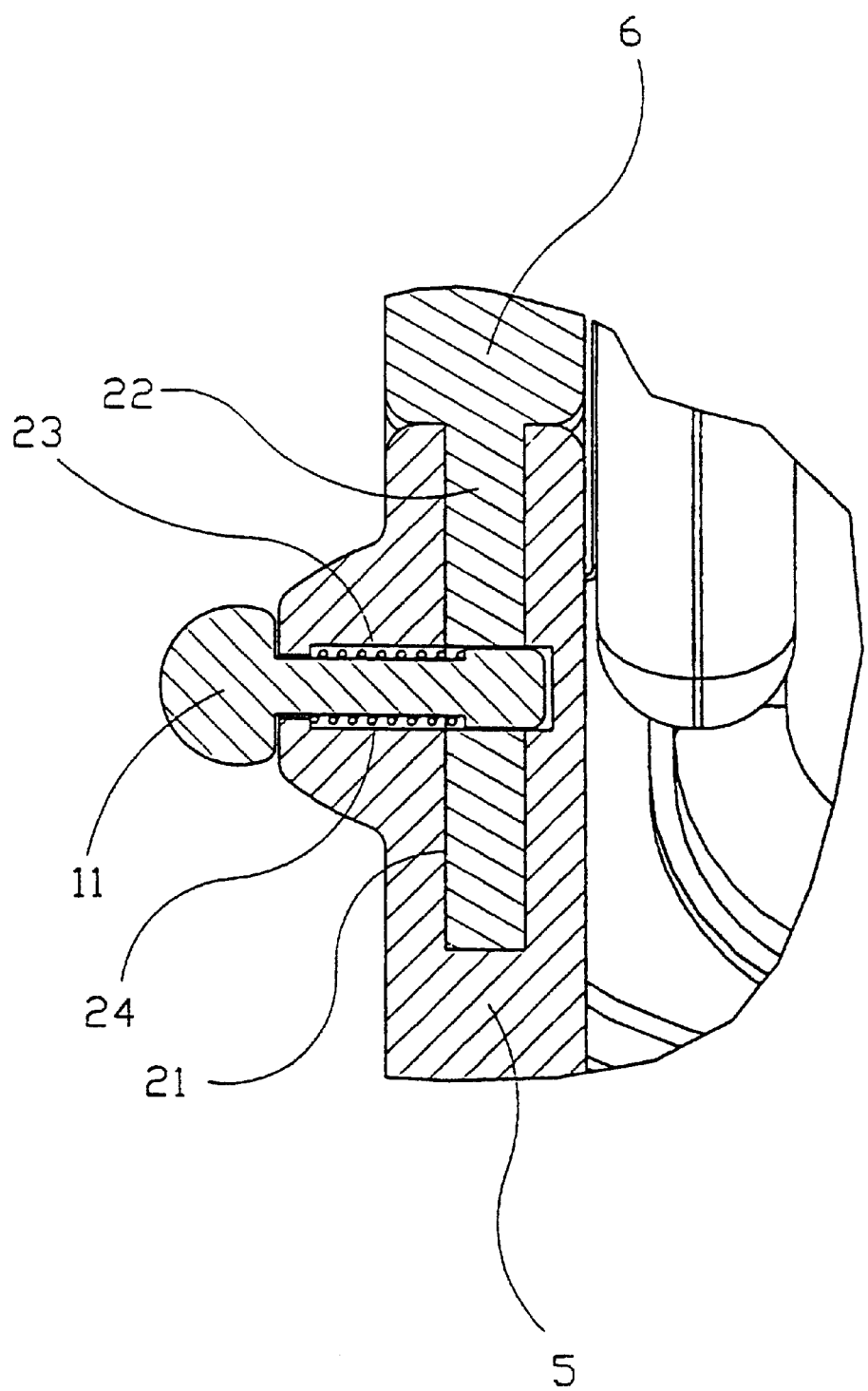
FIG. 3 showing a detail view of a section through the locking pin at the drawn line A—A in FIG. 2.

The child seat is retained in its unfolded position of use by means of a locking pin 11, which is releasably arranged in regions of the shells 5, 6 of the side portion parts, which overlap when the child seat is unfolded. As shown in FIG. 3, one of the side portion shells 5 has a slot 21 which is adapted for enclosing a narrower portion 22 of the other side portion shell 6. The locking pin 11 is positioned in a bore 23 formed in the shells 5, 6 and is retained in its locking position by means of a compression spring 24.

Figure 4:
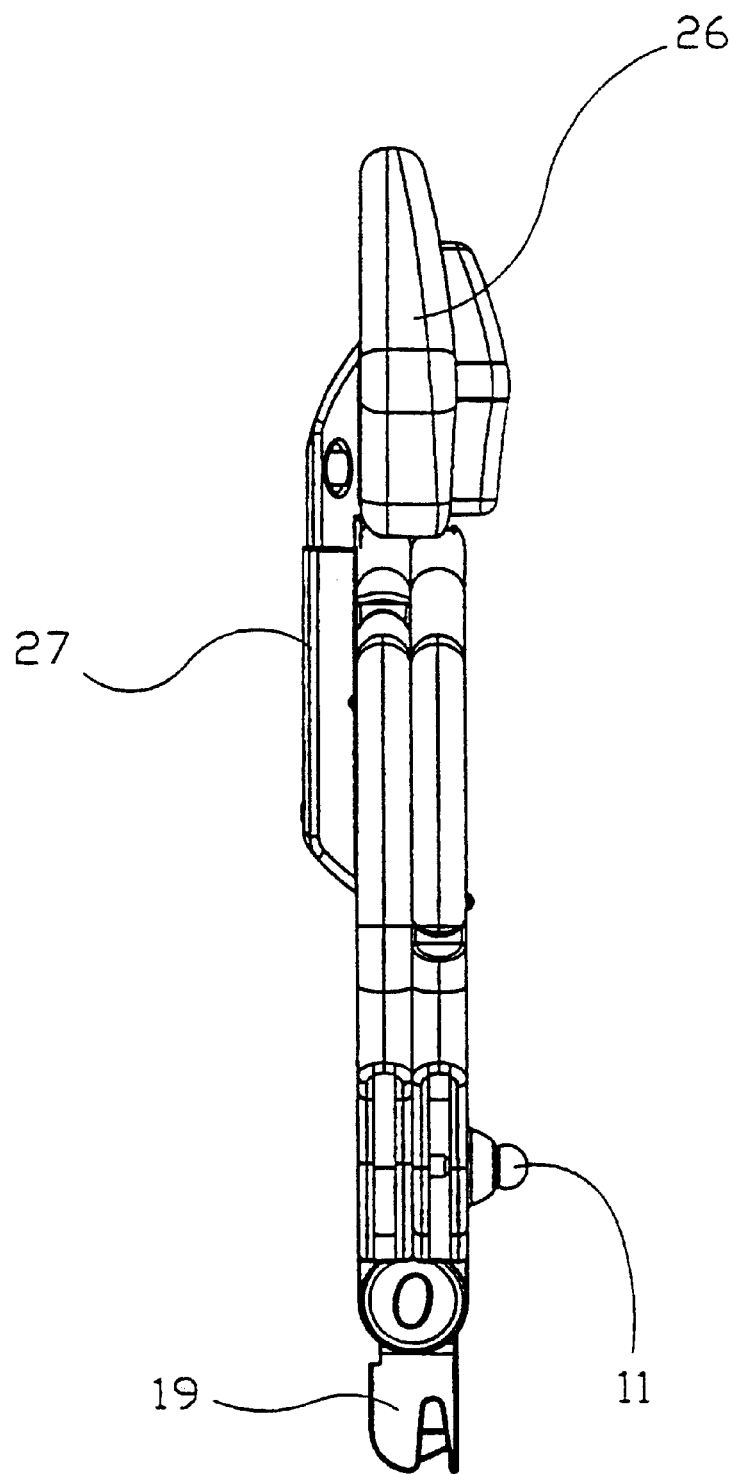
FIG. 4 showing a view of the child seat which is folded up, the child seat viewed directly towards the side portion.
Figure 5:
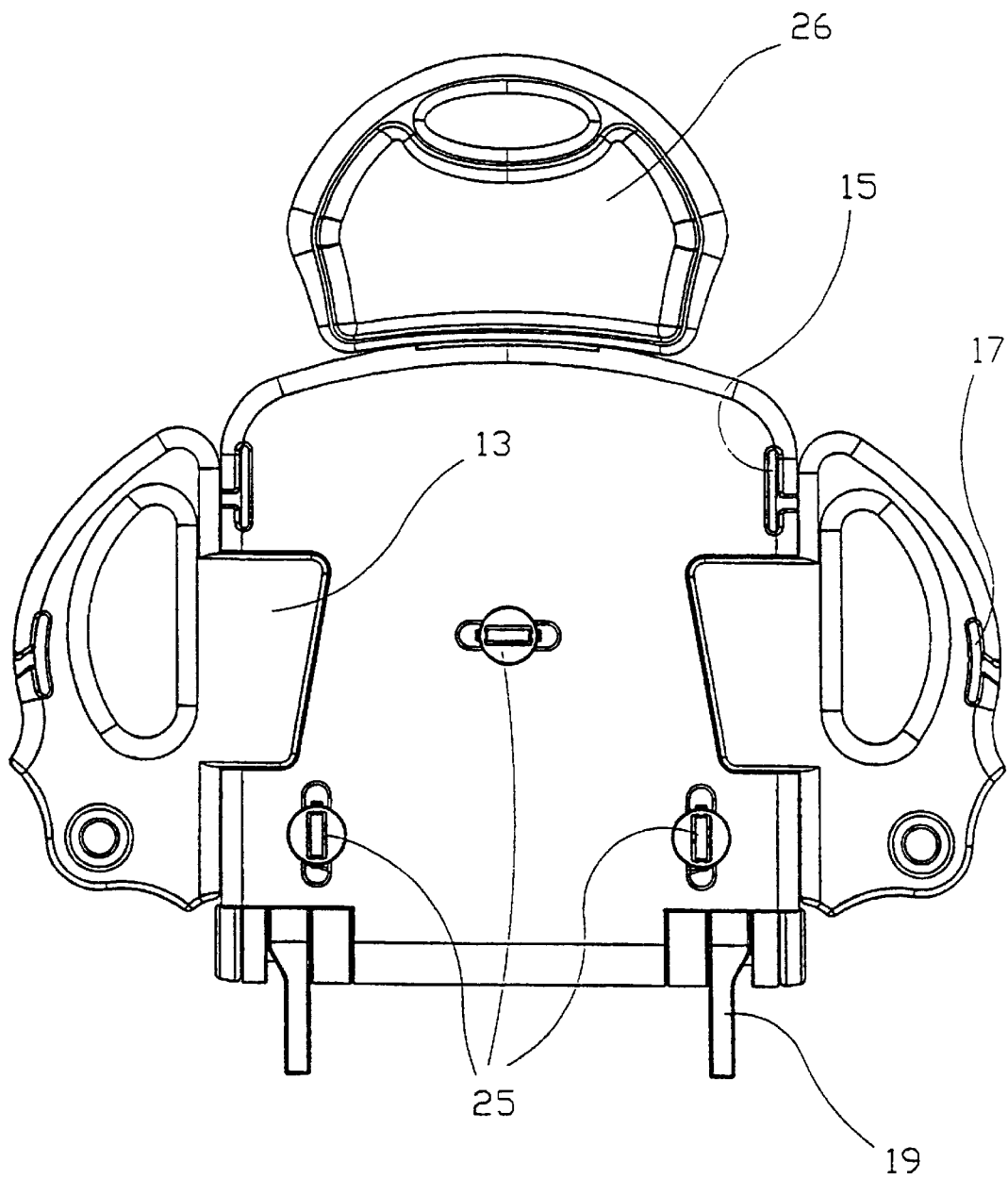
FIG. 5 showing the same as FIG. 4, the child seat being viewed directly towards the seat portion.

When the child seat is to be folded up, the locking pin 11 is pulled outwards in the bore 23 until the locking pin 11 clears the narrower shell portion 22, which allows the seat and back portions to be pivoted outwards relative to one another at least until the narrower portion 22 and the slot 21 are pulled apart completely. Then the side portion parts may be pivoted outwards until they are flush with the respective ones of the seat and back portions. The folding up of the child seat is completed in that the seat and back portions are pivoted towards one another until, as shown in FIGS. 4–5, they fold up against each other completely. The child seat is brought into its unfolded position in that the above procedure is carried out in reverse order. As already mentioned, the cushions 3, 4, 7, 8, 10 are deflated before/at the same time as the folding up is commenced, and are filled with air when the child seat is unfolded.

At the seat portion 1, 3, to allow adjustment of the seat angle of the child seat, the shell 5 of the side portion part comprises a spacer 13 pointing downwards from the seat portion and normally standing on the seat of the vehicle. The spacer 13 is placed at the pivotal joint of the side portion part 5, 7 and is shown as a fixed piece. Of course, this last point does not prevent the spacer 13 from being made adjustable in a suitable manner by means of e.g. two pieces that may be displaced and fixed in the desired position relative to one another.

The cushions 3, 4, 7, 8 can be inflated by means of a pump 14 which is shown integrated in the seat portion 1, 3, but the pump 14 may, when required, be positioned at a different point in the child seat. Further the cushions are connected to each other in an appropriate manner not shown, in order thereby to provide for the air to reach all the cushions during inflation. The air is let out of the cushions through for example at least one valve, which is not shown either.

The child seat may be secured by means of either a seat belt or standardized securing points in the vehicle. In the former case the seat belt is passed through slots 15, 16, 17, 18 formed in the respective shells of the child seat, and in the latter case through at least two securing elements 19 which are formed rearwards in the extension of the seat portion 1, 3.

The second embodiment of the child seat, which is shown in FIGS. 6–9, corresponds in most points to the first embodiment which is shown in FIGS. 1–5. The difference consists in the side portions 9, 9' with associated cushions 10 not being split in two, but being in the form of one single piece, the child seat being maintained in its unfolded position of use by means of a locking element, which is releasably arranged in the back portion 2, 4, and the side portions 9, 9', 10 being pivoted inwards towards the seat portion 1, 3 in the folding up.

Figure 6:
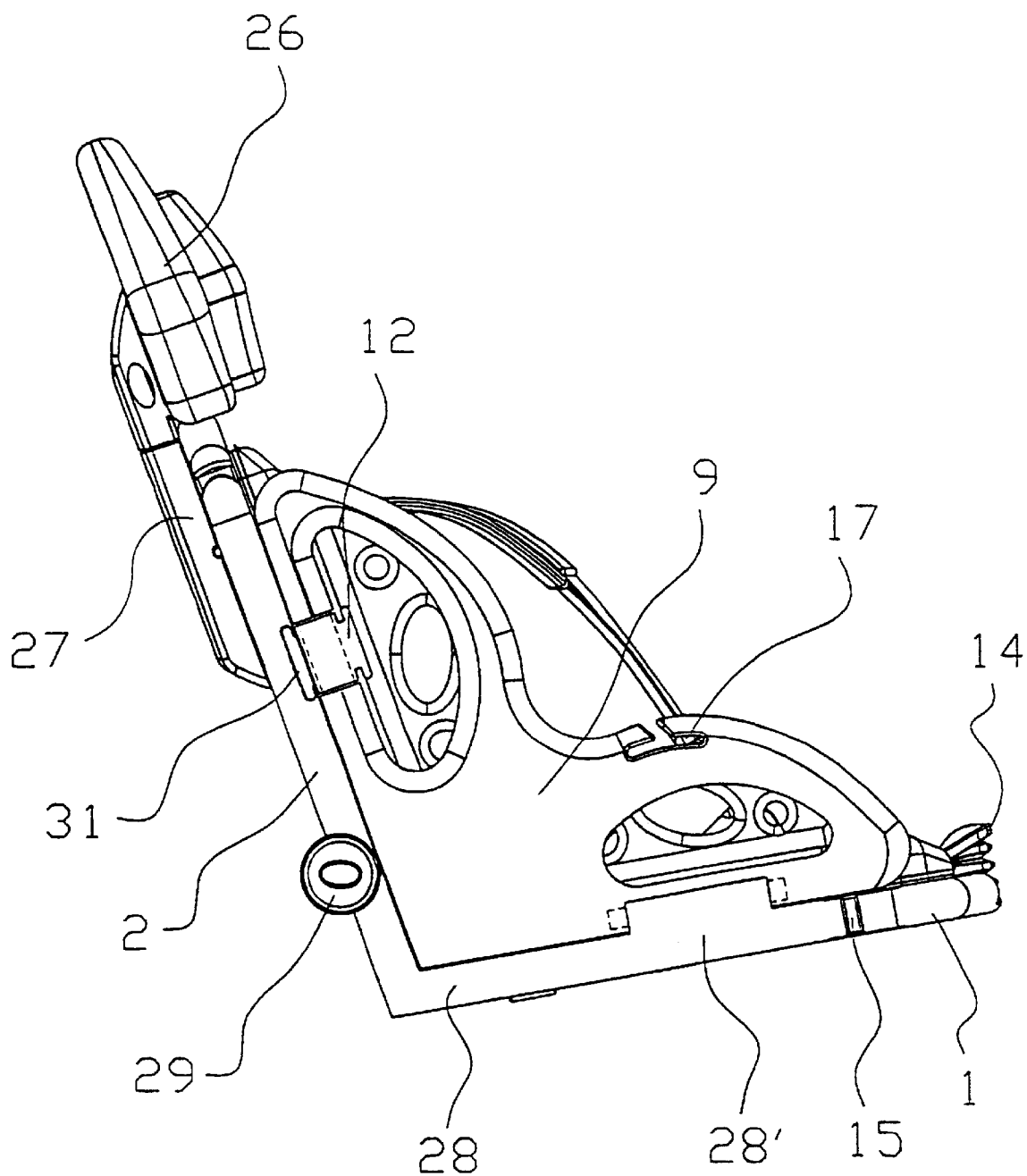
FIG. 6 showing a view of a further embodiment, the child seat viewed directly towards one of the side portions, the side portion not being split, and the child seat being held fixed in its unfolded position of use by means of a locking element which is releasably arranged in the back portion.
Figure 7:
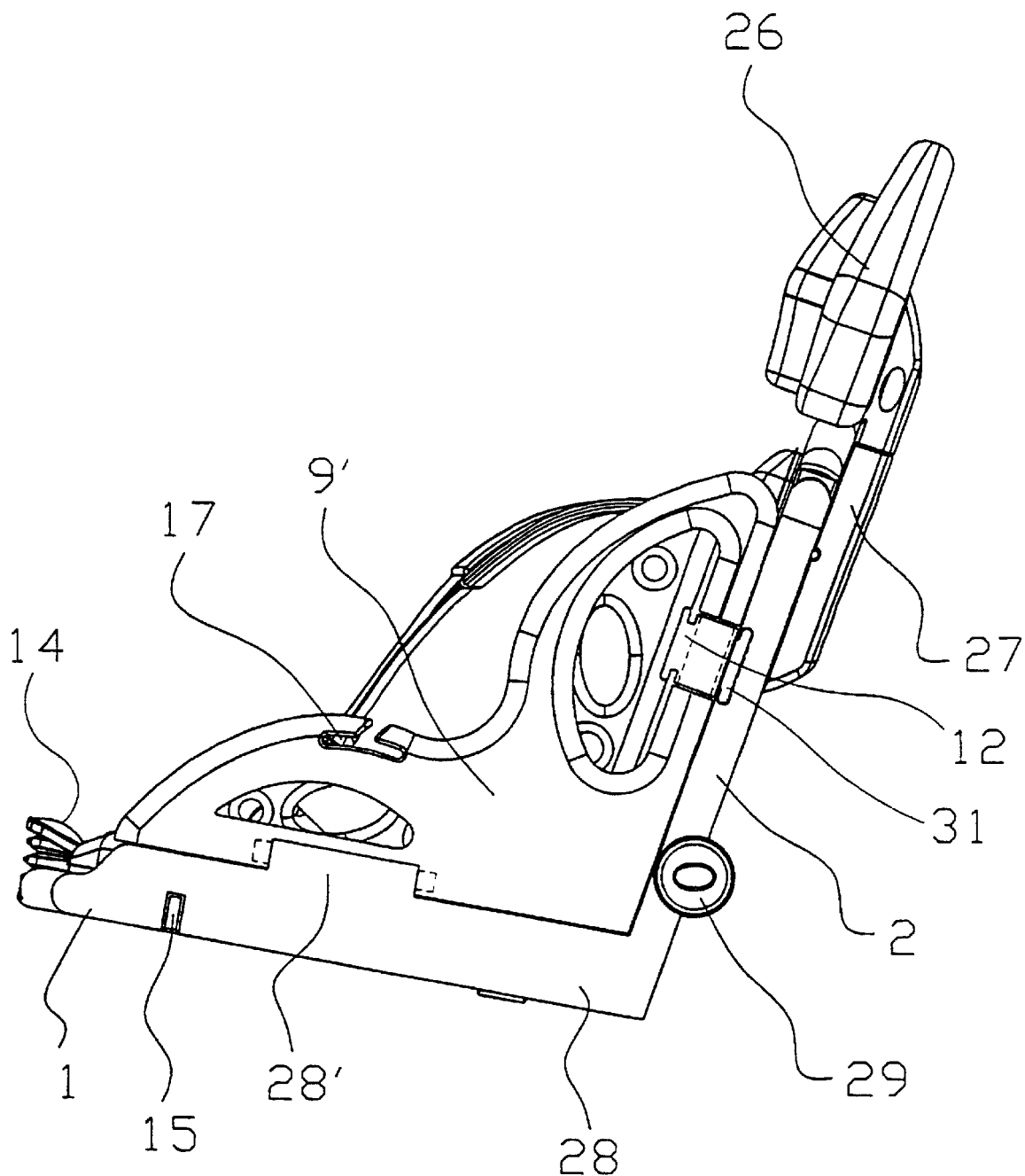
FIG. 7 showing the same as FIG. 6, the child seat viewed directly towards the opposite side portion.
Figure 8:
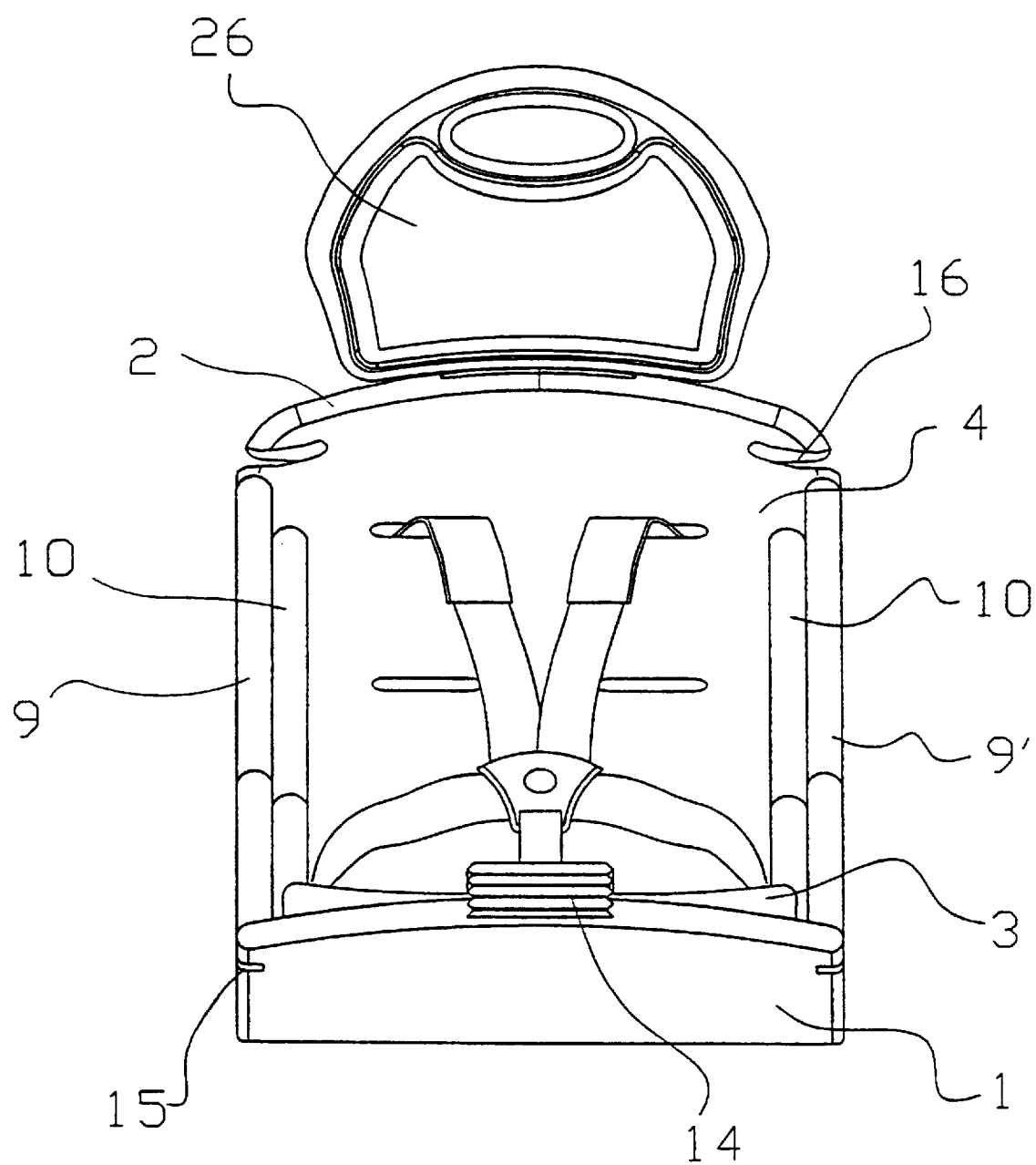
FIG. 8 showing a view of the child seat of FIG. 6, the child seat viewed directly towards the back portion.
Figure 9:
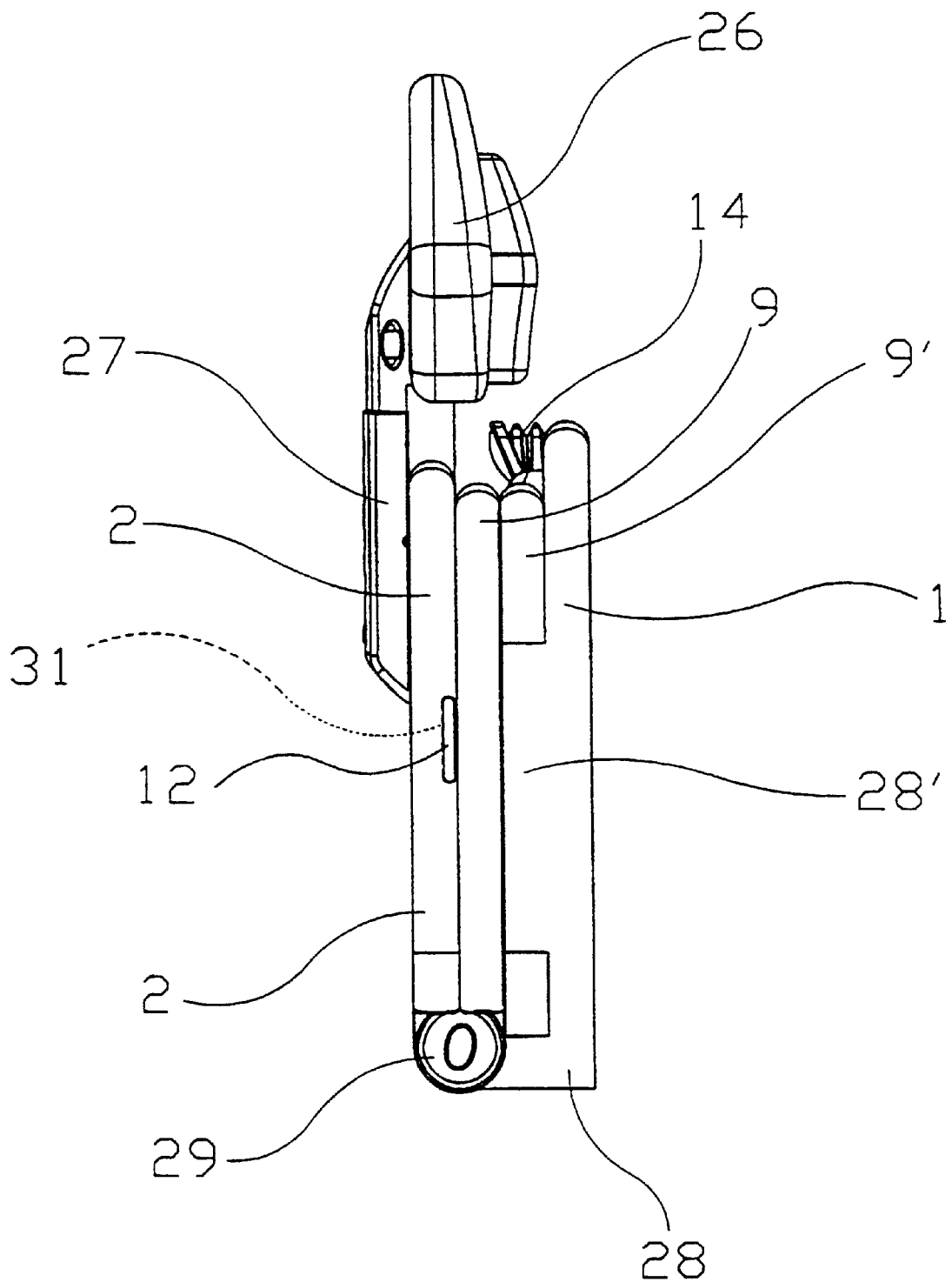
FIG. 9 showing a view of the child seat of FIG. 6, the child seat being folded up and the child seat being viewed directly towards the side portion.

To provide for the side portions 9, 9', 10 to be pivoted inwards in the folding, the pivots 28' for the respective side portions 9, 9', 10, as shown in FIGS. 6–8, are positioned at different heights relative to the seat portion 1, 3. Further, the seat portion shell 1 comprises a fixed portion 28, which extends upwards towards the shell 2 of the back portion at an angle of approximately 90 degrees, so that the pivot 29 of the seat and back portions are above the pivot 28' of the side portions.

In the latter embodiment the child seat is held fixed in its unfolded position of use by means of a locking element 12, which is releasably arranged in a groove 31 formed in the shell 2 of the back portion. The locking element 12 is positioned at the edge of the side portion shell 9 and made pivotal in a suitable manner, e.g. through a pin and sleeve connection. Similarly, when the child seat is unfolded, the locking element 12 is retained in the locking groove 31 by means of a not shown compression spring, for example, so that when the child seat is to be folded up, the locking element 12 can be pivoted out of the locking groove 31 against the spring force.

Figure 10:
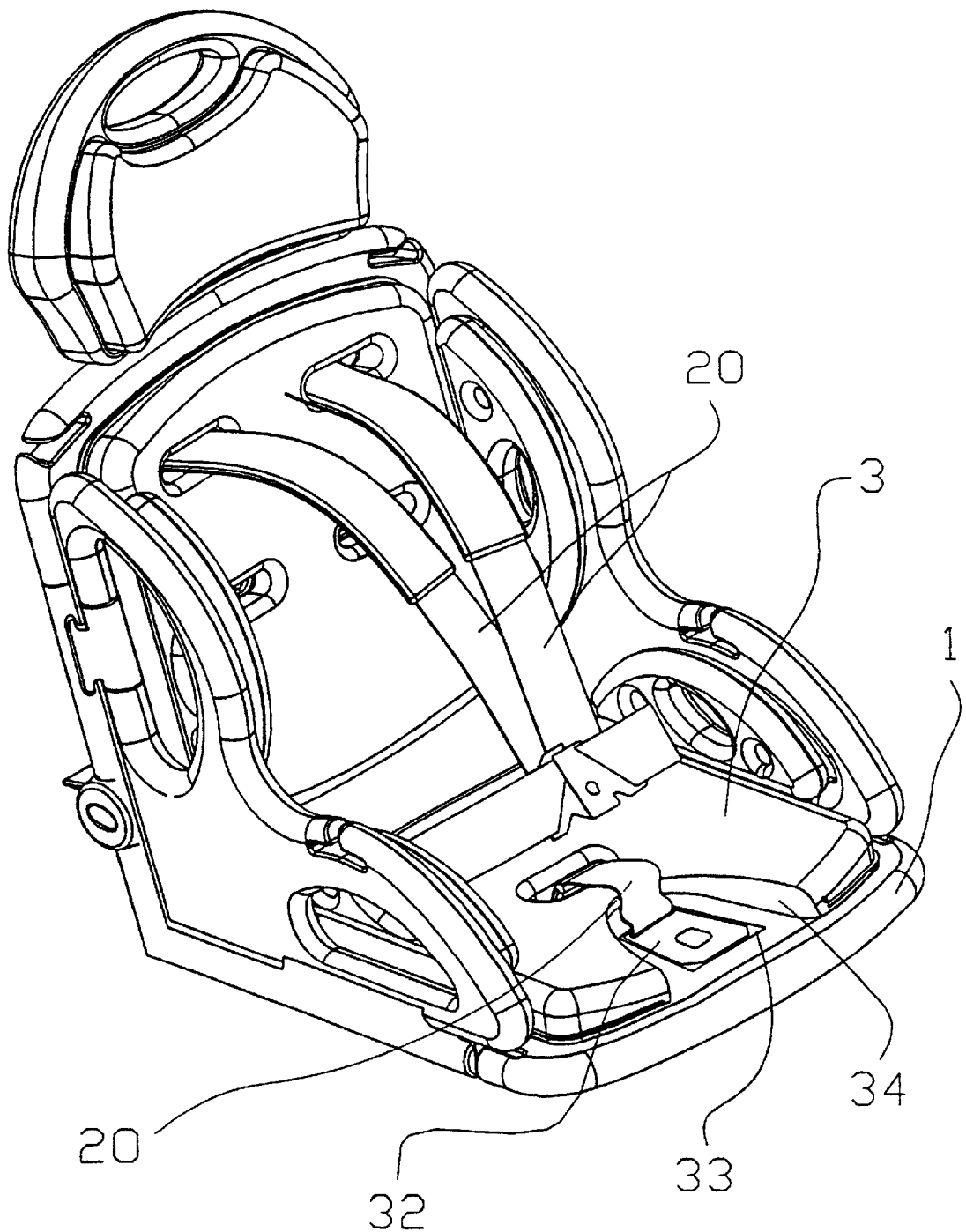
FIG. 10 showing a perspective view of yet another embodiment of the present invention, a belt buckle of the seat belt of the child seat being placed in the seat portion.

The child seat is shown with a seat's separate seat belt 20 and a head restraint 26. The securing points 25 for the seat's seat belt 20 are shown in FIG. 5. The head restraint 26 is arranged fixed or displaceable in a support 27, which is shown e.g. in FIG. 2, and has an outer shell and an inner portion of soft material. In FIG. 10 is shown, moreover, how a belt buckle 32 of the seat's seat belt 20 can be placed and retained in the seat portion 1, 3. This is done by means of a particular recess 33, which is formed in the seat portion shell 1, whereas the seat portion cushion 3 has a corresponding recess 34. It should be understood that the embodiment according to FIGS. 6–9 with the undivided side portions may be equipped correspondingly.

What is claimed is:

1. A foldable seat device for securing a child in a motor vehicle comprising:

a seat base portion (1, 3);

a seat back portion (2, 4) pivotally connected to said seat base portion, said seat portions having rigid outer elements and inner cushion elements;

seat side portions pivotally connected to sides of said seat base portion and said seat back portion and movable to allow said seat device to assume an operative condition and a folded condition, each of said seat side portions comprising a rigid seat side element (5) pivotally connected to said seat base portion and a rigid seat side element (6) pivotally connected to said seat back portion, said seat side elements having portions overlapping each other when said seat device is in the operative condition; and a releasable locking mechanism (11, 21, 22, 23, 24) connecting the overlapping portions of said seat elements of each of said seat side portions together to form said seat side portions, said seat side portions so formed retaining said seat base portion and said seat back portion in a stable, child protective position for the operative condition of said seat device.

2. A foldable seat device according to claim 1, characterized in that the rigid seat side elements (5, 6) are locked by means of a releasable locking pin (11) extending through the overlapping portions.

3. A foldable seat device according to claim 2, characterized in that one of the rigid seat side elements (5) is provided with a portion having a slot (21) adapted to receive a narrower portion (22) formed in the other rigid seat side element (6), each of said portion having a bore (23) therethrough adapted to receive the locking pin (11).

4. A foldable seat device according to claim 3, characterized in that the locking pin (11) is self-tensioned and is secured in a locking position by means of a spring (24).

5. A foldable seat device according to claim 1, characterized in that the seat device comprises a seat belt (20) for the child, of which the belt buckle (32), when not used, can be secured in a recess (33, 34) arranged in the seat base portion (1, 3).

6. A foldable seat device according to claim 5, characterized in that the belt buckle recess comprises a first recess (33) formed in the rigid seat base element (1) and a complementary recess (34) formed in the seat base cushion element (3), thereby allowing the belt buckle (32) to be secured.

7. A foldable seat device according to claim 1 wherein said cushion element of at least one of said seat base portion and said seat back portion is inflatable.

8. A foldable seat device for securing a child in a motor vehicle comprising:

a seat base portion (1, 3);

a seat back portion (2, 4) pivotally connected to said seat base portion, said seat portions having rigid outer elements and inner cushion elements;

seat side portions pivotally connected to sides of said seat base portion and said seat back portion and movable to allow said seat device to assume an operative condition and a folded condition, each of said seat side portions comprising a single piece, rigid seat side element (5) pivotally connected to the rigid outer element of said seat base portion (1), said seat side portions each having a releasable locking element (12) adapted, when said seat device is in the operative condition to be received by a locking groove (31) formed in the rigid outer element of said seat back portion, said seat side portions retaining said seat base portion and said seat back portion in a stable, child protective position when said releasable locking element is received in said locking groove.

9. A foldable seat device according to claim 8, characterized in that locking elements (12) are self-tensioned and are secured in the locking position by means of springs.

10. A foldable seat device according to claim 8, characterized in that the seat device comprises a seat belt (20) for the child, of which the belt buckle (32), when not used, can be secured in a recess (33, 34) arranged in the seat base portion (1, 3).

11. A foldable seat device according to claim 10, characterized in that the belt buckle recess comprises a first recess (33) formed in the rigid seat base element (1) and a complementary recess (34) formed in the seat base cushion element (3), thereby allowing the belt buckle (32) to be secured.

12. A foldable seat device according to claim 8 wherein said cushion element of at least one of said seat base portion and said seat back portion is inflatable.

* * * * *